Figure 1:
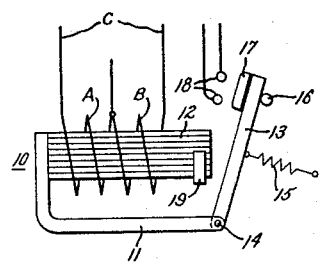

Nov. 15, 1960 R. B. TAYLOR 2,960,631
PHASE SEQUENCE RESPONSIVE ELECTROMAGNETIC DEVICE
Filed Oct. 11, 1955

Inventor:
Robert B. Taylor,
by J. Wesley Hauber
His Attorney.

United States Patent Office 2,960,631
Patented Nov. 15, 1960

2,960,631

PHASE SEQUENCE RESPONSIVE ELECTROMAGNETIC DEVICE

Robert B. Taylor, Schenectady, N.Y., assignor to General Electric Company, a corporation of New York Filed Oct. 11, 1955, Ser. No. 539,840

5 Claims. (Cl. 317—48)

The invention relates to phase sequence responsive devices, and more particularly to reverse-phase circuit controlling relays capable of discriminating between the normal and reverse phase rotation or sequence of a polyphase circuit.

Such reverse-phase relays may be used in various ways in polyphase circuit protective or control systems. They are particularly useful for opening a polyphase motor energizing circuit or preventing closure thereof in order to protect against rotation of the motor in the wrong direction in case of accidental or inadvertent reversal of the normal phase sequence of the supply source. Any unexpected reversal of the normal phase sequence of a polyphase motor energizing circuit is likely to produce quite dangerous conditions, for example, in machine tool, hoist or elevator service or the like.

The usual form of reverse-phase relay now available is, in effect, a small polyphase motor-driven contact making and breaking device utilizing the well-known induction disk wattmetric operating principle. Thus, when the relay windings are energized from a polyphase circuit having the normal phase rotation or sequence, the resulting motor action of the currents induced in the induction disk or vane produces rotation thereof in a corresponding direction, for example, in the direction required to close the relay contacts. But a reversal of the normal phase sequence will produce a corresponding reversal in the direction of rotation of the induction disk or vane and thus open the relay contacts. For reliable discriminating action, an appreciable power input is required to induce the currents in the induction disk or vane.

One of the objects of the present invention is to provide an improved and simplified electromagnetic form of phase sequence responsive device having a new and improved phase angle resultant magnetization operating principle that entirely eliminates the reversely rotatable induction disk or vane and thus requires only a relatively low power input.

Another object is to provide an improved phase sequence responsive device having a movable magnetic operating member and two phase windings in mutual magnetizing relation for magnetizing the magnetic member and provided with differing magnetizing current phase angle modifying means proportioned to produce a resultant magnetization sufficient to attract the magnetic operating member when normally energized in a predetermined phase sequence and insufficient to attract the magnetic operating member upon reversal of the phase sequence.

In carrying out the present invention in a preferred form, an ordinary sensitive electromagnetic relay structure may be used, for example, one having only a single core and a movable magnetic operating member or armature biased away from the core. In accordance with the improved principles of the present invention, the single core is provided with two phase windings interlinking the core in mutual magnetizing relation and having differing magnetizing current phase angle modifying impedance means suitably proportioned to make the effective magnetization of the core responsive to phase sequence. Preferably, one winding has a suitable resistive impedance connected in series therewith, and the other winding has a suitable capacitive impedance connected in series therewith. The particular impedance values are not critical although, preferably, the resistive impedance is made sufficiently large to absorb the phase voltage when the reactance of the one phase winding is reduced or becomes negligible due to the reduction or absence of flux in the core. Also, the capacitive impedance preferably is proportioned to locate the phase angle of the magnetizing current of the other phase winding substantially 60 degrees from that of the other winding. As thus constructed and proportioned, when the two phase windings in mutual magnetizing relation and having the differing phase angle modifying impedance means are normally energized in the predetermined normal phase sequence, the resultant magnetization produced by the two phase windings can be made sufficient to attract the movable magnetic member or armature. But upon reversal of the phase sequence, the resultant magnetization produced by the two phase windings can be materially reduced or made substantially negligible since due to the mutual magnetizing relation, the magnetizing effects of the two phase windings can be made substantially to neutralize each other. Thus, under such phase reversal conditions the movable magnetic member or armature remains unattracted or is released from its attracted position.

Figure 2:
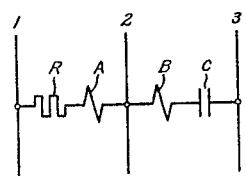
Figure 3:
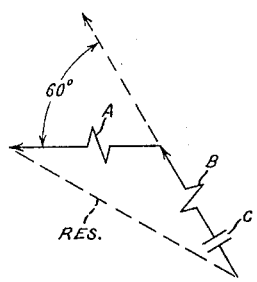
Figure 4:

The advantageous features of the improved phase sequence responsive electromagnetic device provided by the present invention, as well as the improved operating principle thereof, will be more fully understood from the following description taken in conjunction with the accompanying drawings in which Fig. 1 shows a sensitive electromagnetic circuit control relay structure having two phase windings A and B in mutual magnetizing relation on a single core, and a movable magnetic operating member or armature to be attracted thereby. Fig. 2 shows schematically a resistive impedance connected in circuit with the phase winding A, and a capacitive impedance connected in circuit with the phase winding B in order to render the senstive electromagnetic relay structure shown in Fig. 1 phase sequence responsive in accordance with the present invention. Figs. 3 and 4 are schematic vector magnetization diagrams useful in explaining the operating principles of the present invention.

As shown in Fig. 1, the sensitive electromagnetic relay indicated generally by the reference character 10 is of the usual form having a magnetic flux circuit formed by the magnetic frame 11, the core 12 and the movable magnetic member 13. This magnetic circuit is magnetized by the two phase windings A and B that are in mutual magnetizing relation and preferably substantially equally interlink the core 12 as schematically shown, although this is not too critical. The movable magnetic operating member 13 is shown pivotally supported on the pin 14 and is biased by the spring 15 to the unattracted position in which it rests against the stop 16. The movable magnettic operating member 13 carries the contact 17, preferably insulated therefrom, into bridging circuit closing engagement with the contacts 18 when the magnetic member 13 is attracted sufficiently to overcome the bias of spring 15. To prevent chatter and insure quiet operation, the usual pole shading winding 19 is provided.

In order to enable the sensitive relay 10 shown in Fig. 1 to respond to phase rotation or sequence in accordance with the present invention, a magnetizing current phase angle modifying impedance means such as the resistor R is connected in the energizing phase circuit of winding A, and a magnetizing current phase angle modifying impedance means such as the capacitor C is connected in the energizing phase circuit of winding B as indicated schematically in Fig. 2. Preferably, the resistor R has a resistive impedance value sufficient to absorb the phase voltage between lines 1 and 2 when the reactance of winding A becomes relatively low due to the reduction or absence of a flux in the core 12, although this is not too critical, as explained hereinafter. The capacitive impedance of capacitor C preferably is proportioned large enough to advance the magnetizing current phase angle of winding B substantially 60 degrees; i.e., substantially 60 degrees behind that of winding A with normal phase rotation as indicated in Fig. 3, although this also is not too critical as explained hereinafter.

The operation of relay 10 when energized from a threephase circuit as schematically shown in Fig. 2 is as follows: Under normal phase rotation or sequence conditions, even with the mutual inductive relation between the windings A and B on the single core 12, the provision of the resistor R in the energizing phase circuit of winding A will advance the usual lagging phase angle of the magnetizing current closer to the energizing voltage of phase A. The amount of such advance will vary with the resistive impedance value of resistor R. Likewise, the provision of the capacitor C in the energizing phase circuit of winding B will advance the phase angle of the magnetizing current relative to the energizing voltage of phase B. The amount of this advance will also vary with the capacitive impedance of the capacitor C. In this way the phase angles of the magnetizing currents of the two windings A and B can be brought substantially into the 60-degree relative phase displacement relationship shown schematically in Fig. 3 when member 13 is in its attracted position.

In Fig. 3 the line A represents the magnitude and phase position of the magnetizing current of winding A, and the line B represents the magnitude and relative phase angle position of the magnetizing current of winding B as substantially 60 degrees from that of winding A, preferably with member 13 in its attracted position. Therefore, the resultant magnetization of core 12 under normal phase sequence conditions may be represented by the line Res. Upon suitable adjustment of the tension of spring 15 such a resultant magnetization will normally be sufficient to attract the movable magnetic member or armature 13 so as to move this member out of engagement with the stop 16 and into the attracted position in which contact 17 bridges the circuit controlling contacts 18.

Upon a reversal of the phase rotation or sequence of the three-phase circuit 1—2—3 from which the relay windings A and B are energized as shown in Fig. 2, the magnetizing current of winding A may be assumed to have some phase position such as schematically shown in Fig. 4. In this case, however, due to the phase angle modifying proportioning in accordance with the present invention, the magnetizing current of the winding B will necessarily have an opposite relative phase position substantially as indicated in Fig. 4. This is due to the fact that upon phase reversal the phase B current would naturally lead the phase A current by 120 degrees. But since the phase B current will be further advanced by the capacitor C another 60 degrees, the over-all result of phase reversal is that the phase currents A and B become substantially 180 degrees apart or in substantial opposition. Consequently, the resultant magnetization of the core 12 will become substantially zero since the magnetizing effects of the two windings A and B in mutual magnetizing relation are substantially equal and in substantially opposite phase relation and hence substantially neutralize each other. Thus, under such reverse phase or rotation sequence conditions, the resultant magnetization of the core 13 by the windings A and B having magnetizing effects substantially equal and substantially in opposite phase relationship will not attract the movable magnetic member 13. Consequently, if the member is in the attracted position, the bias of spring 15 will serve to move the member 13 to its unattracted position in which it rests against the stop 16.

In this case when the resultant magnetization of the two windings A and B is negligible or substantially zero, the reactive impedance of these windings becomes materially reduced and the resistor R absorbs most of the voltage of the phase energizing the winding A, while the capacitor C absorbs most of the voltage of the phase energizing the winding B.

While the maximum sensitivity of the reverse phase relays is obtained when the resultant magnetization of windings A and B is substantially zero as indicated in Fig. 4 under reverse phase sequence conditions, it is entirely feasible to obtain satisfactory reverse phase discriminating action in case the resultant magnetization is not substantially zero. In such case, the tension of the spring 15 may be made sufficient to cause the magnetic member 13 to move to its unattracted position even though the core 12 remains magnetized to some appreciable extent. In this way, the relay armature 13 dropout value may become a substantial part of the pick-up magnetization value, for example, 50 percent of rated voltage. The minimum pickup magnetization value ordinarily is about 70 percent of rated voltage.

Various combinations of components have been found to operate successfully in carrying out the present invention. For example, winding B comprised 6750 turns and had a resistance of 982 ohms D.-C., while winding A comprised 6200 turns and had a resistance of 628 ohms D.-C. There is no significance that the turns on the two windings are slightly different. This happened to be a standard coil that was available and had approximately equal turns on the two sections. If used as a conventional voltage relay each coil would have a continuous rating of about 230 volts. Various phase angle modifying impedance components and their relative effects on the voltage distribution in the circuit are indicated in the following tables, with 235 volts, three-phase, 60-cycle power applied to the lines 1, 2, 3 as shown in Fig. 2.

*Normal phase rotation*

| R ohms | C mfd | Armature open | | | | Armature closed | | | |
|---|---|---|---|---|---|---|---|---|---|
| | | $E_R$ | $E_A$ | $E_B$ | $E_C$ | $E_R$ | $E_A$ | $E_B$ | $E_C$ |
| 4000 | .5 | 57 | 220 | 270 | 420 | 23 | 216 | 270 | 380 |
| 3500 | .25 | 110 | 173 | 190 | 407 | 68 | 185 | 206 | 397 |

*Reverse phase rotation*

| R ohms | C mfd | Aramtaure open | | | | Armature closed | | | |
|---|---|---|---|---|---|---|---|---|---|
| | | $E_R$ | $E_A$ | $E_B$ | $E_C$ | $E_R$ | $E_A$ | $E_B$ | $E_C$ |
| 4000 | .5 | 165 | 72 | 50 | 283 | 170 | 70 | 67 | 282 |
| 3500 | .25 | 140 | 98 | 58 | 260 | 122 | 108 | 72 | 290 |

While I have shown and described a preferred form of my invention by way of illustration, many modifications will occur to those skilled in the art. I therefore contemplate by the appended claims to cover all such modifications as fall within the true spirit and scope of my invention.

What I claim as new and desire to secure by Letters Patent of the United States, is:

1. In a phase sequence responsive device for use with a polyphase source, magnetically operable means including a core member and a movable magnetic member, two phase windings mounted on said core member in mutual magnetizing relation for magnetizing the magnetic member each of said windings being connected across a different phase of said source so as to be responsive to the voltage thereof and having differing magnetizing current phase angle modifying means proportioned to provide a resultant magnetization effective to move the magnetic member when normally energized in a predetermined phase sequence and an ineffective resultant magnetization upon reversal of the phase sequence.

2. In a phase reversal responsive device for use with a polyphase source, a magnetic core member and a magnetic circuit including a movable magnetic member, two phase windings mounted on said core member interlinking the magnetic circuit in mutual magnetizing relation each of said windings being connected across a different phase of said source so as to be responsive to the voltage thereof and each having differing magnetizing current phase angle modifying means proportioned to locate the phase angle of the current in one winding substantially 60 degrees from that of the other winding when normally energized in a predetermined phase sequence and in substantial opposition therewith upon reversal of the phase sequence.

3. In a phase sequence responsive device for use with a polyphase source, a magnetic circuit including a core member and a movable magnetic member, two phase windings mounted on said core member substantially equally interlinking the magnetic circuit in mutual magnetizing relation each of said windings being connected across a different phase of said source so as to be responsive to the voltage thereof and having magnetizing current phase shifting impedance means in circuit therewith proportioned to provide a resultant magnetization effective to attract the movable magnetic member when normally energized in a predetermined phase sequence, and an ineffective resultant magnetization upon reversal of the phase sequence.

4. In a phase sequence responsive device for use with a polyphase source, a magnetic circuit including a core member and a movable magnetic member, two phase windings mounted on said core member interlinking the magnetic circuit in mutual magnetizing relation each of said windings being connected across a different phase of said source so as to be responsive to the voltage thereof and one having a resistive impedance and the other having a capacitive impedance in circuit therewith proportioned to provide a resultant magnetization sufficient to attract the movable magnetic member when normally energized in a predetermined phase sequence and insufficient to attract the member upon reversal of the phase sequence.

5. In a phase sequence responsive circuit controlling device for use with a polyphase source, circuit controlling means having an magnetic member and a movable magnetic operating member, means biasing said movable member to one position, two phase windings mounted on said core member in mutual magnetizing relation for magnetizing the magnetic member each of said windings being connected across a different phase of said source so as to be responsive to the voltage thereof and having differing magnetizing current phase angle modifying means proportioned to locate the phase angle of the current of one winding substantially 60 degrees behind that of the other winding when normally energized in a predetermined phase sequence and in substantial opposition upon reversal of the phase sequence.

References Cited in the file of this patent

UNITED STATES PATENTS

| | | |
|---|---|---|
| 1,646,028 | Lewis | Oct. 18, 1927 |
| 2,290,233 | Gilliver | July 21, 1942 |
| 2,486,004 | Clark | Oct. 25, 1949 |

FOREIGN PATENTS

| | | |
|---|---|---|
| 227,430 | Great Britain | June 25, 1925 |